United States Patent
Tsioutsiouliklis et al.

(10) Patent No.: US 8,429,177 B2
(45) Date of Patent: Apr. 23, 2013

(54) USING EXCEPTIONAL CHANGES IN WEBGRAPH SNAPSHOTS OVER TIME FOR INTERNET ENTITY MARKING

(75) Inventors: Konstantinos Tsioutsiouliklis, San Jose, CA (US); Bruce Smith, San Francisco, CA (US); Dmitri Pavlovski, San Francisco, CA (US); Alexander Anatoly Arsky, Los Altos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 302 days.

(21) Appl. No.: 11/350,967

(22) Filed: Feb. 8, 2006

(65) Prior Publication Data

US 2007/0198603 A1 Aug. 23, 2007

(51) Int. Cl.
*G06F 7/00* (2006.01)
(52) U.S. Cl.
USPC .......................................... 707/751; 707/795
(58) Field of Classification Search .................. 707/2–3, 707/6, 749, 751
See application file for complete search history.

(56) References Cited

U.S. PATENT DOCUMENTS

| | | | |
|---|---|---|---|
| 4,167,652 A * | 9/1979 | Braugenhardt et al. | 370/379 |
| 6,112,203 A | 8/2000 | Bharat et al. | |
| 6,285,999 B1 | 9/2001 | Page | |
| 6,326,962 B1 | 12/2001 | Szabo | |
| 6,728,752 B1 | 4/2004 | Chen et al. | |
| 7,624,095 B2 | 11/2009 | Majumder | |
| 7,739,281 B2 * | 6/2010 | Najork | 707/735 |
| 8,051,105 B1 | 11/2011 | Johnson | |
| 2002/0059221 A1 * | 5/2002 | Whitehead et al. | 707/5 |
| 2002/0061022 A1 * | 5/2002 | Allen et al. | 370/392 |
| 2003/0002436 A1 * | 1/2003 | Anderson et al. | 370/218 |
| 2003/0004912 A1 * | 1/2003 | Pant et al. | 706/47 |
| 2003/0033279 A1 * | 2/2003 | Gibson et al. | 707/1 |
| 2003/0048307 A1 | 3/2003 | Bryan et al. | |
| 2003/0204502 A1 * | 10/2003 | Tomlin et al. | 707/5 |
| 2003/0208482 A1 | 11/2003 | Kim et al. | |
| 2004/0002988 A1 * | 1/2004 | Seshadri et al. | 707/102 |
| 2004/0143600 A1 * | 7/2004 | Musgrove et al. | 707/104.1 |
| 2004/0199445 A1 * | 10/2004 | Eder | 705/35 |

(Continued)

OTHER PUBLICATIONS

Mishra, R. et al., "KhjoYantra: An Integrated MetaSearch Engine with Classification, Clustering and Ranking" 2000 IEEE (pp. 122-131).

(Continued)

*Primary Examiner* — James Trujillo
*Assistant Examiner* — Linh Black
(74) *Attorney, Agent, or Firm* — Hickman Palermo Truong Becker Bingham Wong LLP; Edward A. Becker

(57) ABSTRACT

Techniques are provided through which "suspicious" web pages may be identified automatically. A "suspicious" web page possesses characteristics that indicate some manipulation to artificially inflate the position of the web page within ranked search results. Web pages may be represented as nodes within a graph. Links between web pages may be represented as directed edges between the nodes. "Snapshots" of the current state of a network of interlinked web pages may be automatically generated at different times. In the time interval between snapshots, the state of the network may change. By comparing an earlier snapshot to a later snapshot, such changes can be identified. Extreme changes, which are deemed to vary significantly from the normal range of expected changes, can be detected automatically. Web pages relative to which these extreme changes have occurred may be marked as suspicious web pages which may merit further investigation or action.

22 Claims, 3 Drawing Sheets

U.S. PATENT DOCUMENTS

| | | | |
|---|---|---|---|
| 2004/0260695 | A1 | 12/2004 | Brill |
| 2005/0071478 | A1 | 3/2005 | Bates et al. |
| 2005/0071741 | A1* | 3/2005 | Acharya et al. ............... 715/500 |
| 2005/0210008 | A1* | 9/2005 | Tran et al. .......................... 707/3 |
| 2005/0243850 | A1* | 11/2005 | Bass et al. ..................... 370/412 |
| 2005/0251468 | A1* | 11/2005 | Eder ............................... 705/35 |
| 2005/0254106 | A9* | 11/2005 | Silverbrook et al. ......... 358/539 |
| 2005/0256734 | A1 | 11/2005 | Clikeman |
| 2005/0288954 | A1* | 12/2005 | McCarthy et al. ................ 705/1 |
| 2006/0036598 | A1 | 2/2006 | Wu |
| 2006/0064411 | A1 | 3/2006 | Gross et al. |
| 2006/0085248 | A1* | 4/2006 | Arnett et al. .................... 705/10 |
| 2006/0085391 | A1* | 4/2006 | Turski et al. ...................... 707/3 |
| 2006/0155703 | A1 | 7/2006 | Dejean et al. |
| 2006/0218010 | A1* | 9/2006 | Michon et al. .................... 705/3 |
| 2007/0100795 | A1 | 5/2007 | Daview |
| 2007/0124698 | A1 | 5/2007 | Majumder |
| 2007/0129997 | A1 | 6/2007 | Davies |
| 2008/0114753 | A1 | 5/2008 | Tal-Ezer |
| 2008/0313247 | A1 | 12/2008 | Galvin |
| 2008/0319971 | A1 | 12/2008 | Patterson |

OTHER PUBLICATIONS

Varlamis, I. et al., "THESUS, a Closer View on Web Content Management Enhanced with Link Semantics" 2004 IEEE (pp. 685-700).
Office Action received in International application No. 20058003229.1 with English translation, dated Apr. 24, 2009 (11 pages).
Current claims in International application No. 20058003229.1, Jun. 2009 (5 pages).
Rejection Decision received in Chinese Application No. 20058003229.1 dated Oct. 23, 2009 (11 pages).
Current Claims of Chinese Application No. 20058003229.1 dated Sep. 4, 2009 (6 pages).
"Communication pursuant to Article 94(3) EPC" received in International application No. 05 821 001.4-2201 dated Sep. 7, 2009 (6 pages).
Current Claims of International application No. 05 821 001.4-2201, Oct. 2009 (2 pages).
Gyongyi, Z. et al., "Combating Web Spam with TrustRank" XP-002366338 dated Mar. 1, 2004 (22 pages).
U.S. Appl. No. 11/825,392, filed Jul. 6, 2007, Interview Summary, Mailing Date Jan. 26, 2010.
U.S. Appl. No. 11/825,392, filed Jul. 6, 2007, Final Office Action, Mailing Date May 17, 2010.
U.S. Appl. No. 11/769,641, filed Jun. 27, 2007, Final Office Action, Mailing Date Feb. 15, 2011.
Japanese Office Action received in Application No. 539077/2007, Applicant: Yahoo, Dated Feb. 17, 2011 (2 pages).
Japanese Current Claims of Application No. 539077/2007, (3 pages).
Gyongyi, Zoltan, "Combating Web Spam with TrustRank", Proceedings of the 30th VLDB Conference, Mar. 11, 2004, pp. 576-587.
Mansanori Harada, "Ranking of the Search Results by a Search Engine, Bit", vol. 32, No. 8 Japan, Kyoritsu Shuppan Co. Ltd, Aug. 2000, No. 8, pp. 8-14.
Notice of Preliminary Rejections in application 10-2007-7011999, Applicant: Yahoo Inc., Dated Oct. 21, 2011, 1 page.
Current Claims for application 10-2007-7011999, Applicant: Yahoo Inc., Dates Oct. 2011, 4 pages.
Japan Office Action received in application No. 2007-539077, Applicant: Yahoo Inc., Dated Aug. 29, 2011, 2 pages.
Current Claims in application 2007-539077, Applicant: Yahoo Inc., Dated Aug. 2011, 3 pages.
Xue, G. et al., "Implicit Link Analysis for Small Web Search", Proceedings of the 26th annual international ACM SIGIR conference on Research and development in information retrieval (2003) (8 pages).
U.S. Appl. No. 11/769,641, filed Jun. 27, 2007, Notice of Allowance, Mailing Date Jun. 28, 2012.

* cited by examiner

USING EXCEPTIONAL CHANGES IN WEBGRAPH SNAPSHOTS OVER TIME FOR INTERNET ENTITY MARKING

FIELD OF THE INVENTION

The present invention relates to search engines and, more specifically, to a technique for automatically identifying websites whose ranking attributes might have been artificially inflated.

BACKGROUND

Search engines that enable computer users to obtain references to web pages that contain one or more specified words are now commonplace. Typically, a user can access a search engine by directing a web browser to a search engine "portal" web page. The portal page usually contains a text entry field and a button control. The user can initiate a search for web pages that contain specified query terms by typing those query terms into the text entry field and then activating the button control. When the button control is activated, the query terms are sent to the search engine, which typically returns, to the user's web browser, a dynamically generated web page that contains a list of references to other web pages that contain or are related to the query terms.

Usually, such a list of references will be ranked and sorted based on some criteria prior to being returned to the user's web browser. Web page authors are often aware of the criteria that a search engine will use to rank and sort references to web pages. Because web page authors want references to their web pages to be presented to users earlier and higher than other references in lists of search results, some web page authors are tempted to artificially manipulate their web pages, or some other aspect of the network in which their web pages occur, in order to artificially inflate the rankings of references to their web pages within lists of search results.

For example, if a search engine ranks a web page based on the value of some attribute of the web page, then the web page's author may seek to alter the value of that attribute of the web page manually so that the value becomes unnaturally inflated. For example, a web page author might fill his web page with hidden metadata that contains words that are often searched for, but which have little or nothing to do with the actual visible content of the web page. For another example, a web page author might run a macro (an automated program that simulates user actions) that repeatedly selects a reference to his web page within a list of search results so that it appears to the search engine that his web page is popular.

When web page authors engage in these tactics, the perceived effectiveness of the search engine is reduced. References to web pages which have little or no actual "earned" merit are sometimes pushed above references to web pages that users have previously found interesting or valuable for legitimate reasons. Thus, it is in the interests of those who maintain the search engine to "weed out," from search results, references to web pages that are known to have been artificially manipulated in the manner discussed above. However, because there are so many web pages accessible through the Internet, and because the Internet is a dynamic entity, always in flux, manually examining and investigating every existing web page is a daunting and expensive, if not downright futile, task.

What is needed is an automated way of identifying web pages that are likely to have been manipulated in a manner that artificially inflates rankings of references to those web pages within lists of search results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
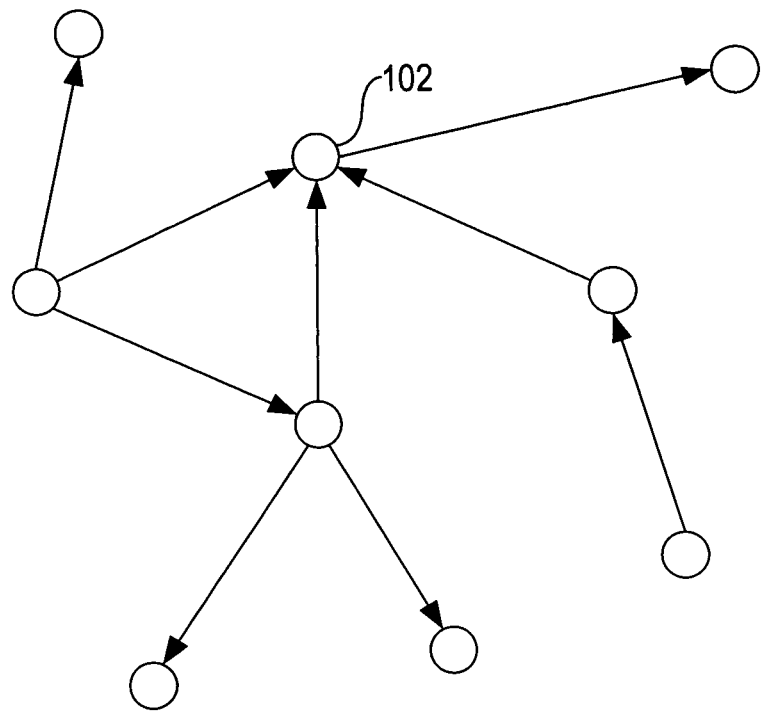
FIG. 1A is a diagram that illustrates an example of a first graph representing a first state of a network of linked pages, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided through which "suspicious" web pages (or other entities) within a set of web pages (or other entities) may be identified automatically. A "suspicious" web page (or other entity) is a web page (or other entity) which possesses attributes or characteristics that tend to indicate that the web page (or other entity) was manipulated in a way that would artificially inflate the position or ranking of a reference to the web page (or other entity) within a list of ranked search results returned by a search engine, such as the Internet search engine provided by Yahoo!. Web pages are not the only entities that may be identified as "suspicious." Other suspicious entities that may be identified as "suspicious" include hosts and domains, among others. Techniques provided herein additionally may be used to identify exceptional entities that exhibit abnormal attributes or characteristics due solely to their excellence and high quality.

According to one technique, known web pages are represented as nodes within a graph. Wherever one web page contains a link to another web page, that link is represented in the graph by a directed edge. A directed edge leads from one node, which represents the web page containing the link, to another node, which represents the web page to which the link refers. Thus, a graph representation of the current state of a network of interlinked web pages can be generated at any desired time.

According to one technique, "snapshots" of the current state of a network of interlinked web pages are automatically generated at different times. For example, through the graph representations described above, one snapshot may represent the state of a network of interlinked web pages at a first time, and another snapshot may represent the state of the network of interlinked web pages at a second time. Between the first time and the second time, the state of the network may change.

For example, the number of links that a particular web page contains ("outgoing links") might increase between the first time and the second time. By comparing the first snapshot to the second snapshot, such changes can be identified. Extreme changes, which are deemed to vary significantly from the normal range of expected changes, can be detected automatically. Web pages relative to which these extreme changes have occurred may be marked as suspicious web pages which may merit further investigation or action.

For example, a first snapshot of a network of interlinked web pages might indicate that a particular web page contains ten outgoing links. A second snapshot of the network, taken a mere week later, might indicate that the particular web page contains one thousand outgoing links. If the normal expected change in each web page's number of outgoing links over a week is in the range of five links, then the particular web page may be marked as a suspicious web page.

The technique described above also can be applied to entities other than web pages. This technique, and variations and extensions of this technique, are described in greater detail below.

Example Graphs and Snapshots

As is discussed above, a network of interlinked web pages may be represented as a graph. In one embodiment of the invention, the nodes in the graph correspond to the web pages in the network, and the directed edges between the nodes in the graph correspond to links between the web pages. In one embodiment of the invention, web pages are automatically discovered and indexed by a "web crawler," which is a computer program that continuously and automatically traverses hyperlinks between Internet-accessible web pages, thereby sometimes discovering web pages that the web crawler had not previously visited. Information gathered and stored by the web crawler indicates how the discovered web pages are linked to each other.

FIG. 1A is a diagram that illustrates an example of a first graph representing a first state of a network of linked pages, according to an embodiment of the invention. The graph might represent the state of the known Internet on Jan. 1, 2005, for example. The graph comprises several nodes, including node 102. Each node represents a known web page. There are three incoming links to node 102 from other nodes, and there is one outgoing link from node 102 to another node.

Figure 1B:
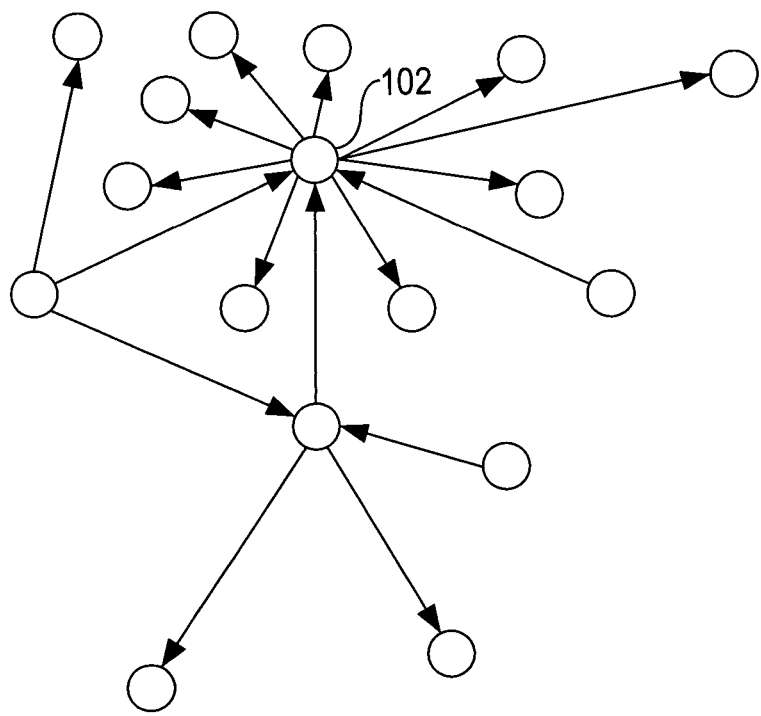
FIG. 1B is a diagram that illustrates an example of a second graph representing a second state of the network of linked pages, according to an embodiment of the invention.

FIG. 1B is a diagram that illustrates an example of a second graph representing a second state of the network of linked pages, according to an embodiment of the invention. The graph might represent the state of the known Internet on Feb. 1, 2005, for example. Some previously existing nodes have vanished, and some new nodes have appeared (as a result of discoveries made by the web crawler during the time interval between the first and second states). This time, instead of there being only one outgoing link from node 102, there are nine outgoing links from node 102 to other nodes.

Based on the extreme increase in the number of outgoing links from node 102 over a period of just one month, the particular web page which corresponds to node 102 may be marked or otherwise identified as a suspicious web page. It is possible that the author of the particular web page might have generated a bunch of new "dummy" web pages and created new links to those dummy web pages from the particular web page for the sole reason of increasing the number of outgoing links from the particular web page. The author might have done so if he knew that an Internet search engine ranks the web pages more favorably if those web pages have a large number of outgoing links.

Identifying Suspicious Web Pages

Figure 2:
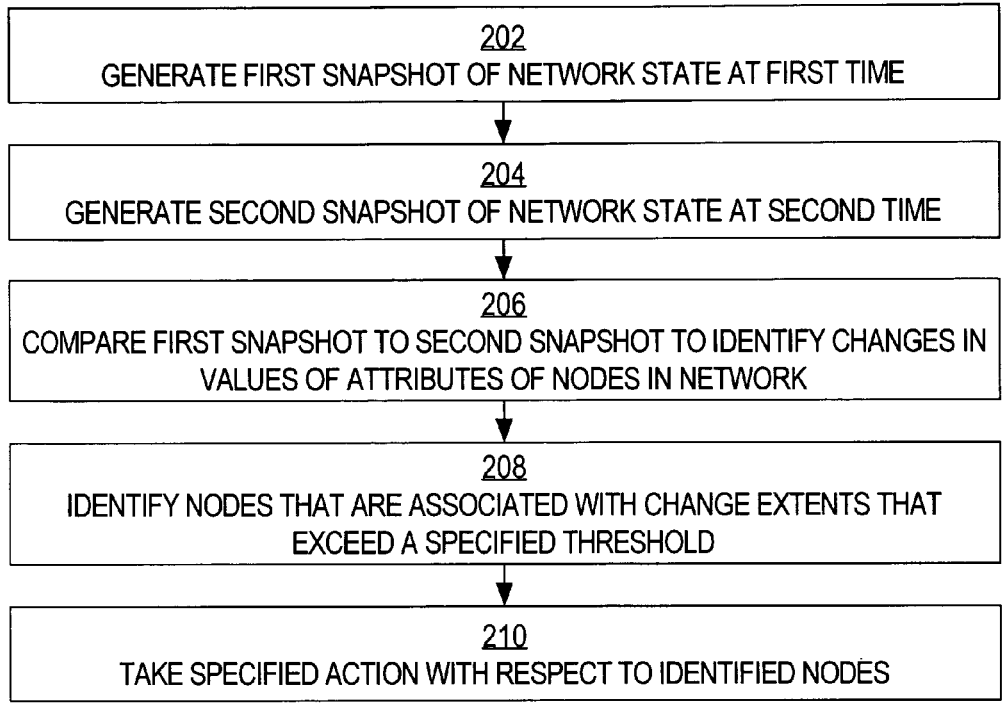
FIG. 2 is a flow diagram that illustrates an example of a technique for automatically identifying suspicious web pages, according to an embodiment of the invention.

FIG. 2 is a flow diagram that illustrates an example of a technique for automatically identifying suspicious web pages, according to an embodiment of the invention. The technique described is merely one embodiment of the invention. Some other alternative embodiments of the invention are described further below. The technique, or portions thereof, may be performed, for example, by one or more processes executing on a computer system such as that described below with reference to FIG. 4.

In block 202, a first snapshot, which represents a first state of a network of interlinked pages at a first time, is generated. The first snapshot may be in the form of a graph such as is described above with reference to FIG. 1A, for example. Because the nodes of the graph represent web pages, the graph according to this embodiment of the invention is called a "web graph." According to other embodiments of the invention, some of which are described in greater detail below, the nodes of a graph may alternatively represent entities other than web pages. For example, at higher levels of abstraction, the nodes may represent hosts on which multiple web pages may be hosted (in which case the graph is called a "host graph") or Internet domains with which multiple hosts may be associated (in which case the graph is called a "domain graph").

In block 204, a second snapshot, which represents a second state of the network at a second time (later than the first time), is generated. The second snapshot is generated after some specified period of time has passed since the generation of the first snapshot. The second snapshot may be in the form of a graph such as is described above with reference to FIG. 1B, for example. Although the generation of two snapshots is described above for purposes of example, embodiments of the invention are not limited to the generation of only two snapshots. A series of many snapshots may be generated, in which each snapshot represents the state of the network at a different time.

In block 206, changes in the values of the "attributes" of the nodes are determined by comparing the first snapshot to the second snapshot. "Attributes" of a node may comprise any measurable property or characteristics of the entity (e.g., web page) to which the node corresponds. For example, the "attributes" of a node may comprise the number of incoming links to a web page that the node represents, and/or the number of outgoing links from that web page. For each node, the number of incoming links, outgoing links, and/or other attributes associated with that node in the first snapshot may be compared with the number of incoming links, outgoing links, and/or other attributes associated with that node in the second snapshot in order to determine the total change in the numbers of incoming links, outgoing links, and/or other attributes associated with that node during the time interval between the generation of the first and second snapshots.

In block 208, nodes which exhibit changes in attribute values that exceed specified thresholds associated with the attributes corresponding to those attribute values are identified. For example, for a particular attribute (e.g., incoming links, outgoing links, etc.), a list of the nodes may be sorted based on the extent to which the value of the particular attribute for each of those nodes changed between the first and second snapshots. As a result of the sorting, nodes that are associated with relatively large extents of change in the value of the particular attribute end up grouped together at one end of the list. According to one embodiment of the invention, all nodes that are associated with extents of change that exceed a specified threshold are deemed to be "exceptional," or "suspicious," nodes. These nodes might be associated with large extents of change due to natural events in the evolution of the Internet. However, it is also possible that these nodes might be associated with large extents due to the artificial manipulation of entities within the Internet.

Each node may be associated with a different extent of change for each different attribute that the node possesses. For example, a node might have one extent of change relative to the number of incoming links associated with that node, but an entirely different extent of change relative to the number of outgoing links associated with that node (e.g., a node's incoming links might increase between snapshots, but the same node's outgoing links might decrease between snapshots). The sorting and identifying described above may be performed on the nodes numerous times-once for each different attribute. With each round of sorting, a different set of nodes that exhibit change extents that exceed a different specified threshold may be identified. Different attributes may be associated with different specified thresholds.

Figure 3:
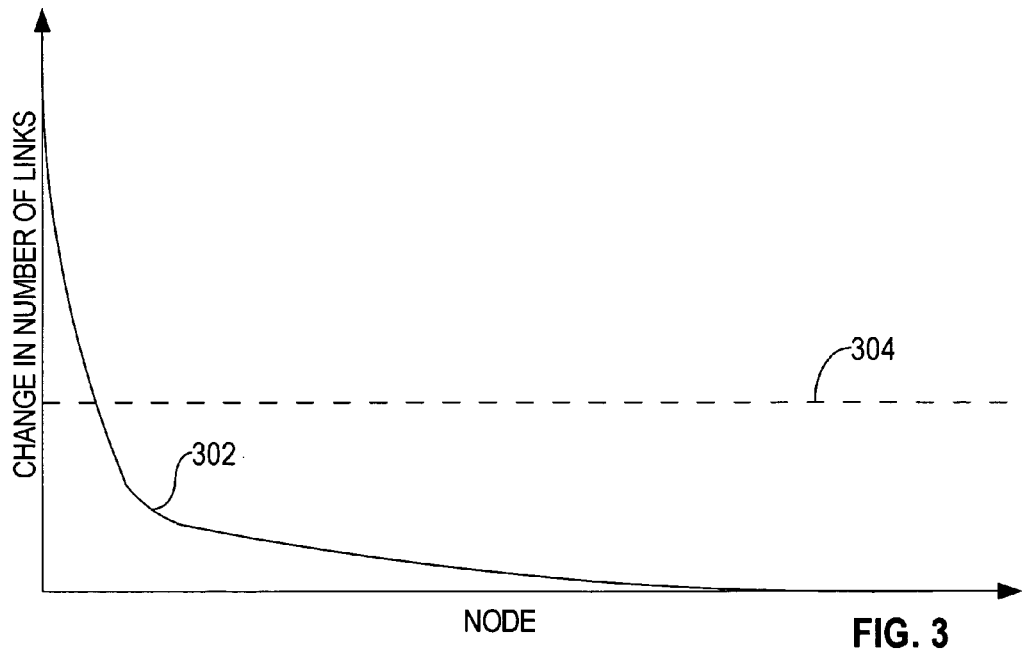
FIG. 3 is a diagram that illustrates an example of a plurality of nodes sorted based on change extents for a particular attributes, according to an embodiment of the invention.

FIG. 3 is a diagram that illustrates an example of a plurality of nodes sorted based on change extents for a particular attribute, according to an embodiment of the invention. FIG. 3 is shown solely for purposes of understanding and exposition; a plot of nodes such as is shown in FIG. 3 does not actually need to be generated in any embodiment of the invention.

The horizontal axis in FIG. 3 represents nodes. The nodes are sorted, from left to right, based on the change extents for a particular attribute associated with those nodes. In this example, the particular attribute is the number of links associated with that node, or, in other words, the number of links (both incoming and outgoing) associated with the web page represented by that node. Thus, in the example of FIG. 3, the vertical axis represents the extent of change in the number of links associated with a node between the first and second snapshot times.

Line 302 represents, for each node, the increase in the number of links associated with that node. Nodes represented to the left extreme on line 302 are associated with the greatest extent of increase, while nodes represented to the right extreme on line 302 are associated with the least extent of increase. Alternatively, instead of an increase in an absolute number of links associated with a node, line 302 may represent, for each node, a rate of growth in the number of links associated with a node during the time interval between snapshots.

A part of line 302 rises above threshold 304, which is represented as a horizontal broken line on the plot. As is discussed above, for different attributes, threshold 304 may occur at different levels. Nodes that are represented by the portion of line 302 that rises above threshold 304 are considered to be "outlying" nodes. Due to the extreme extents of change associated with these nodes, these nodes represent suspicious, or "exceptional," entities. These nodes may be marked for further investigation and/or action. In contrast, nodes that are represented by the part of line 302 that lies beneath threshold 304 are not considered to possess change extents that are out of the ordinary for the particular attribute, so these nodes do not need to be investigated further.

Referring again to FIG. 2, in block 210, specified action is taken with respect to the nodes identified in block 208. For example, in one embodiment of the invention, all references to web pages that are represented by suspicious nodes are automatically eliminated from further inclusion in any set of search results generated by an Internet search engine. Alternatively, in one embodiment of the invention, the rankings of all references to such web pages are automatically reduced so that those web pages occur lower within a set of search results. Alternatively, in one embodiment of the invention, the identities of the web pages represented by suspicious nodes are logged. Logs that identify such web pages may be examined manually by human inspectors. The inspectors may browse the web pages, manually determine whether the web pages actually have been artificially manipulated, and take appropriate action.

As is discussed above, the foregoing technique is but one of many possible variant embodiments of the invention. Some alternative embodiments of the invention are discussed below.

Identifying Suspicious Hosts and Domains

As is discussed above, according to some embodiments of the invention, the nodes of a graph may represent entities other than web pages. For example, at higher levels of abstraction, the nodes may represent hosts on which multiple web pages may be hosted (in which case the graph is called a "host graph") or Internet domains with which multiple hosts may be associated (in which case the graph is called a "domain graph").

Usually, each Internet-accessible resource (e.g., web page) is associated with a Uniform Resource Locator (URL) that is unique to that resource. Each URL comprises a "host part" that identifies a host for the resource, and a "domain part" that identifies a domain for the resource. The domain part typically comprises the "top-level domain" of the URL (e.g., "com," "org," "gov," etc.) and the word or phrase that immediately precedes the top-level domain in the URL. For example, in the URL "www.yahoo.com," the domain part is "yahoo.com." The host part typically comprises the entire part of the URL that precedes the first single (i.e., not double) "/" symbol in the URL, excluding any instance of "http://." For example, in the URL "http://images.search.yahoo.com/search," the host part is "images.search.yahoo.com," while the domain part is merely "yahoo.com."

In a host graph, each node represents a separate host. Directed edges between the nodes represent links between pages hosted on the hosts represented by those nodes. In a domain graph, each node represents a separate domain. Directed edges between the nodes represent links between pages hosted on the hosts included within the domains represented by those nodes.

Similar to the way that suspicious web pages can be identified using techniques described above, suspicious hosts and domains also may be identified. For example, the increase in the number of links associated with a particular host or domain may be examined to identify suspicious hosts or domains.

Other attributes, other than the number of links associated with a node, also may be used. For example, in one embodiment of the invention, each snapshot captures the number of distinct web pages that are hosted by each host. Thus, the increase in the number of web pages hosted by a particular host may be used as the basis of determining whether that host is a suspicious host. Similarly, the increase in the number of hosts contained in a particular domain may be used as the basis of determining whether that domain is a suspicious domain. Practically any measurable attribute of a host or domain can be used to evaluate whether that host or domain is suspicious.

Additionally, instead of measuring the absolute increase in a value for an attribute, a rate of growth may be measured between the value of the attribute at an earlier snapshot and a value of the attribute at a later snapshot. Thus, an entity's growth from one associated link to twenty associated links may be considered much more remarkable and unusual than an entity's growth from one thousand associated links to two thousand associated links, for example.

Hosts, domains, and web pages are not the only entities that can be automatically scrutinized using the techniques described herein. Some of the other possible entities that can be represented by nodes in the kind of graph described above are web sites, Internet Protocol addresses, autonomous systems, top-level domains, etc. Regardless of the level of abstraction of the entities in the graph, the graph can be derived from information collected by an automated web crawler mechanism.

Actions Taken with Respect to Suspicious Entities

Once one or more suspicious entities (e.g., web pages, hosts, domains, etc.) have been automatically identified, a variety of actions may be taken relative to those entities. It may be that some of those entities have experienced unusual growth trends in the values of some of their attributes only because they are legitimately excellent entities. For example, a very high-quality web page might experience a large increase in incoming links over a relatively short period of time only because others recognize the merits of that web page, and not because that web page's author has engaged in any nefarious activity.

Therefore, in some embodiments of the invention, the identities of suspicious entities are logged for further investigation. Such further investigation may be by human investigators, other automated investigating mechanisms—such as mechanisms that implement machine-learning principles, or some combination of these.

In some embodiments of the invention, the closer the value of an entity's attribute to the specified threshold for that attribute, the less certainty there is that the value has been artificially inflated. Therefore, in some embodiments of the invention, when an entity's attribute's value is close to the threshold for that attribute, then that entity is further automatically evaluated on the basis of another different attribute. For example, if the increase in the number of links associated with a host is sufficiently close to the threshold for the "number of links" attribute, then, instead of automatically identifying that host as a suspicious host, the increase in the number of web pages hosted on that host may be evaluated prior to identifying, or not identifying, that host as a suspicious host.

Thus, a "degree of confidence" may be associated with the identification of each entity as either suspicious or not suspicious. Because there may be a few entities which, after being evaluated relative to multiple different attributes, still cannot be identified as suspicious with a high degree of confidence, in one embodiment of the invention, entities which have been identified as being suspicious with only a low degree of confidence are marked for further evaluation by another mechanism (e.g., human or artificial intelligence). In contrast, references to entities which have been identified as being suspicious with a high degree of confidence may be automatically excluded from future lists of search results without further investigation, according to one embodiment of the invention.

In one embodiment of the invention, a "white list" of web pages, hosts, domains, and/or other entities is maintained. For example, search engine administrators may create and maintain a list of domains that are known to be popular and legitimate (e.g., the domain "yahoo.com"). In such an embodiment of the invention, all entities that are on the "white list," and all sub-entities that are hosted on or contained within entities that are on the "white list," are automatically excluded from identification as suspicious entities.

In one embodiment of the invention, references to entities that have been identified as being suspicious are not automatically excluded from future lists of search results, nor are the rankings of such references within future lists of search results automatically adjusted. Instead, in one embodiment of the invention, entities that have been identified as being suspicious are automatically further evaluated based on criteria other than those that were initially used to identify those entities as suspicious entities. For example, a web page that has been deemed to be suspicious may be input into a program that automatically searches for words, in that web page, which are usually found in artificially manipulated web pages (e.g., words dealing with pornographic web sites and/or words dealing with prescription drugs). Such a program may make a further determination, based on an automatic evaluation of the content of the web page, as to whether that web page still should be considered a suspicious web page, and whether references to that web page should be excluded from, or have their rankings adjusted within, lists of search results. In contrast, web pages that were not initially deemed to be suspicious do not need to be input into such a program.

Machine Learning Techniques

Using the techniques discussed above, suspicious web pages may be automatically identified based on extents of changes in values of attributes of those web pages over time. As shown in FIG. 3, a set of suspicious or exceptional entities—those which correspond to nodes that occur on line 302 above threshold 304—may be automatically identified.

In one embodiment of the invention, once such a set of suspicious entities has been formed, those suspicious entities, or portions thereof, may be provided as "training data" for a machine-learning mechanism. Such a machine-learning mechanism may receive a set of suspicious web pages, for example, and automatically identify features that those suspicious web pages tend to have in common. As a result, the machine-learning mechanism "learns" that suspicious web pages tend to have certain features.

Once the machine-learning mechanism has "learned" the features that suspicious web pages or other entities tend to have, the machine-learning mechanism can evaluate additional entities to determine whether those entities also possess the features. The machine-learning entity can determine, based on whether other entities also possess the features, whether those other entities are also suspicious entities. Thus, the machine-learning entity becomes an "automatic classifier." Based on whether those other entities also possess the features, the machine-learning entity can take appropriate action relative to those entities (e.g., excluding references to those entities from lists of search results, etc.).

A machine-learning mechanism also may be supplied a set of web page or other entities that are known to be legitimate. The machine-learning mechanism may be informed that this set represents a legitimate set. The machine-learning mechanism may automatically determine usually shared features of these entities, and, based on whether other entities possess these features, prevent other entities that possess these features from being treated as suspicious entities. Thus, embodiments of the invention may implement machine-learning mechanisms to continuously refine definitions of high-quality web pages and other entities so that such high-quality web pages and other entities can be automatically identified with greater precision and accuracy. Such embodiments of the invention are useful even in the absence of the growth of suspicious entities.

Hardware Overview

Figure 4:
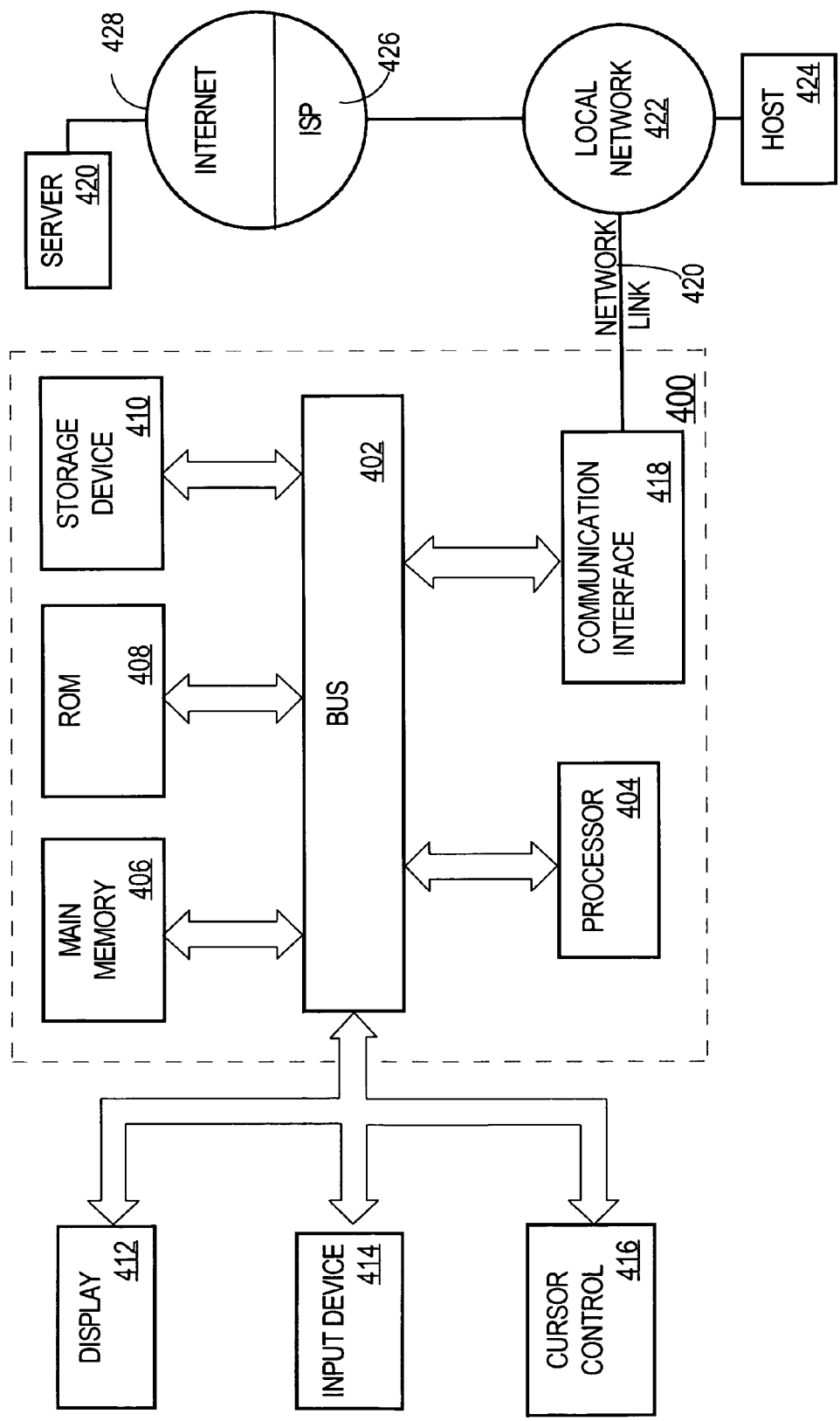
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 400, various machine-readable media are involved, for example, in providing instructions to processor 404 for execution. Such a medium may take many forms, including but not limited to, non-volatile media, volatile media, and transmission media.

Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
measuring, at a first time, for each host of a plurality of hosts, a number of pages hosted on that host;
measuring, at a second time that differs from the first time, for each host of the plurality of hosts, a number of pages hosted on that host;
determining, for each host of the plurality of hosts, a rate of growth in a number of pages hosted on that host between the first time and the second time; and
identifying selected hosts, in the plurality of hosts, which are associated with rates of growth that exceed a specified threshold;
wherein the method is performed by at least one device comprising a processor.

2. The method of claim 1, further comprising:
adjusting, downward, rankings of references to pages hosted on the selected hosts within lists of search results generated by a search engine.

3. The method of claim 1, further comprising:
removing, from lists of search results generated by a search engine, references to pages hosted on the selected hosts.

4. The method of claim 1, further comprising:
logging identities of the selected hosts for further investigation.

5. The method of claim 1, further comprising:
measuring, at the first time, for each host of the plurality of hosts, a number of links associated with that host;
measuring, at the second time, for each host of the plurality of hosts, a number of links associated with that host;
determining, for each host of the plurality of hosts, a rate of growth in a number of links associated with that host between the first time and the second time; and
identifying hosts, in the plurality of hosts, which are associated with rates of growth in numbers of links in which the rates of growth exceed a specified threshold.

6. A method comprising:
measuring, at a first time, for each domain of a plurality of domains, a number of hosts contained within that domain;
measuring, at a second time that differs from the first time, for each domain of the plurality of domains, a number of hosts contained within that domain;
determining, for each domain of the plurality of domains, a rate of growth in a number of hosts contained within that domain between the first time and the second time; and
identifying selected domains, in the plurality of domains, which are associated with rates of growth that exceed a specified threshold;
wherein the method is performed by at least one device comprising a processor.

7. The method of claim 6, further comprising:
adjusting, downward, rankings of references to pages hosted on hosts contained within the selected domains within lists of search results generated by a search engine.

8. The method of claim 6, further comprising:
removing, from lists of search results generated by a search engine, references to pages hosted on hosts contained within the selected domains.

9. The method of claim 6, further comprising:
logging identities of the selected domains for further investigation.

10. The method of claim 6, further comprising:
measuring, at the first time, for each domain of the plurality of domains, a number of links associated with that domain;
measuring, at the second time, for each domain of the plurality of domains, a number of links associated with that domain;
determining, for each domain of the plurality of domains, a rate of growth in a number of links associated with that domain between the first time and the second time; and
identifying domains, in the plurality of domains, which are associated with rates of growth in numbers of associated links in which those rates of growth exceed a specified threshold.

11. The method of claim 10, wherein, for each domain in the plurality of domains, the number of links associated with that domain is one of: (a) a number of links to pages hosted on hosts within that domain from pages hosted on hosts outside that domain, (b) a number of links from pages hosted on hosts within that domain to pages hosted on hosts outside that domain, and (c) a combination of (a) and (b).

12. A non-transitory computer-readable storage medium storing instructions, which when executed by one or more processors, perform steps comprising:
measuring, at a first time, for each host of a plurality of hosts, a number of pages hosted on that host;
measuring, at a second time that differs from the first time, for each host of the plurality of hosts, a number of pages hosted on that host;
determining, for each host of the plurality of hosts, a rate of growth in a number of pages hosted on that host between the first time and the second time;
identifying selected hosts, in the plurality of hosts, which are associated with rates of growth that exceed a specified threshold.

13. A non-transitory computer-readable storage medium storing instructions, which when executed by one or more processors, perform steps comprising:
measuring, at a first time, for each domain of a plurality of domains, a number of hosts contained within that domain;
measuring, at a second time that differs from the first time, for each domain of the plurality of domains, a number of hosts contained within that domain;
determining, for each domain of the plurality of domains, a rate of growth in a number of hosts contained within that domain between the first time and the second time; and
identifying selected domains, in the plurality of domains, which are associated with rates of growth that exceed a specified threshold.

14. The non-transitory computer-readable storage medium of claim 12, further comprising additional instructions which, when processed by the one or more processors causes:
adjusting, downward, rankings of references to pages hosted on the selected hosts within lists of search results generated by a search engine.

15. The non-transitory computer-readable storage medium of claim 12, further comprising additional instructions which, when processed by the one or more processors causes:
removing, from lists of search results generated by a search engine, references to pages hosted on the selected hosts.

16. The non-transitory computer-readable storage medium of claim 12, further comprising additional instructions which, when processed by the one or more processors causes:
logging identities of the selected hosts for further investigation.

17. The non-transitory computer-readable storage medium of claim 12, further comprising additional instructions which, when processed by the one or more processors causes:
measuring, at the first time, for each host of the plurality of hosts, a number of links associated with that host;
measuring, at the second time, for each host of the plurality of hosts, a number of links associated with that host;
determining, for each host of the plurality of hosts, a rate of growth in a number of links associated with that host between the first time and the second time; and
identifying hosts, in the plurality of hosts, which are associated with rates of growth in numbers of links in which the rates of growth exceed a specified threshold.

18. The non-transitory computer-readable storage medium of claim 13 further comprising additional instructions which, when processed by the one or more processors causes:
adjusting, downward, rankings of references to pages hosted on hosts contained within the selected domains within lists of search results generated by a search engine.

19. The non-transitory computer-readable storage medium of claim 13 further comprising additional instructions which, when processed by the one or more processors causes:
removing, from lists of search results generated by a search engine, references to pages hosted on hosts contained within the selected domains.

20. The non-transitory computer-readable storage medium of claim 13 further comprising additional instructions which, when processed by the one or more processors causes:
logging identities of the selected domains for further investigation.

21. The non-transitory computer-readable storage medium of claim 13 further comprising additional instructions which, when processed by the one or more processors causes:
measuring, at the first time, for each domain of the plurality of domains, a number of links associated with that domain;
measuring, at the second time, for each domain of the plurality of domains, a number of links associated with that domain;
determining, for each domain of the plurality of domains, a rate of growth in a number of links associated with that domain between the first time and the second time; and
identifying domains, in the plurality of domains, which are associated with rates of growth in numbers of associated links in which those rates of growth exceed a specified threshold.

22. The non-transitory computer-readable storage medium of claim 21, wherein, for each domain in the plurality of domains, the number of links associated with that domain is one of: (a) a number of links to pages hosted on hosts within that domain from pages hosted on hosts outside that domain, (b) a number of links from pages hosted on hosts within that domain to pages hosted on hosts outside that domain, and (c) a combination of (a) and (b).

* * * * *